US009154941B2

(12) United States Patent
Steely et al.

(10) Patent No.: US 9,154,941 B2
(45) Date of Patent: *Oct. 6, 2015

(54) PROVISIONING USER ATTRIBUTES FOR USE WITH MOBILE COMPUTING DEVICE

(71) Applicant: Lexmark International, Inc., Lexington, KY (US)

(72) Inventors: Forrest Steely, Lexington, KY (US); Samuel Leo Rhodus, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,812

(22) Filed: Sep. 3, 2014

(65) Prior Publication Data
US 2014/0378062 A1 Dec. 25, 2014

Related U.S. Application Data

(63) Continuation of application No. 13/775,342, filed on Feb. 25, 2013, now Pat. No. 8,909,143.

(51) Int. Cl.
H04W 8/22 (2009.01)
G06F 21/62 (2013.01)
G06F 3/0482 (2013.01)
H04M 1/725 (2006.01)
H04W 4/00 (2009.01)
H04W 4/02 (2009.01)
H04W 8/18 (2009.01)
H04W 12/02 (2009.01)

(52) U.S. Cl.
CPC .............. H04W 8/22 (2013.01); G06F 3/0482 (2013.01); G06F 21/6254 (2013.01); H04M 1/72525 (2013.01); H04W 4/001 (2013.01); H04W 4/008 (2013.01); H04W 4/02 (2013.01); H04W 8/183 (2013.01); H04W 12/02 (2013.01)

(58) Field of Classification Search
USPC ......... 455/411, 412.1, 414.1, 420, 41.1, 41.2, 455/41.3, 550.1; 705/39, 40, 41
See application file for complete search history.

(56) References Cited

U.S. PATENT DOCUMENTS 8,196,131 B1* 6/2012 von Behren et al. .......... 717/168
2012/0129493 A1* 5/2012 Vasudevan .................... 455/411
2014/0155038 A1* 6/2014 Fan et al. ...................... 455/411
2014/0222670 A1* 8/2014 Concannon .................... 705/41

* cited by examiner

Primary Examiner — Thanh Le

(57) ABSTRACT

A mobile computing device hosts an operating system and mobile applications. A provisioning application communicates with a secure element and near field communication (NFC) subsystem. It causes display of an interface for users to enter personal attributes for storage in the secure element. Users discriminately select items from their personal attributes for transmission to a third party recipient so only attributes relative to the third party are sent. Software, interfaces, methods, and apparatus typify the embodiments.

18 Claims, 4 Drawing Sheets

PROVISIONING USER ATTRIBUTES FOR USE WITH MOBILE COMPUTING DEVICE

FIELD OF THE INVENTION

The present invention relates to mobile computing devices, such as smart phones. It relates also to applications on mobile devices requiring personal attributes supplied by users. Software, interfaces, methods, and apparatus enable users to discriminately select relevant attributes for delivery to third party recipients.

BACKGROUND

Modern society requires users to provide personal information to enroll in various processes. Examples include admission to hospitals, registering at hotels, applying for bank loans/mortgages, appointments with physicians, checking-in for flights, and the like. Users are commonly asked to provide basic information such as name, address, phone number, etc. Users are also asked to provide specific information relevant to the recipient's process, such as social security number, driver's license number/state, automobile license plate number, insurance group/policy number, checking and savings account numbers, frequent flyer number, etc. The specific information is also typically private or sensitive in nature.

Recipients manually key in information received verbally from users. They also capture it with semi-automated techniques (computer scan) that read entries submitted on paper forms/questionnaires. The former is tedious, time consuming, subject to memory failures of the recipient, keystroke errors, etc. The latter requires movement of personnel back and forth to scanning equipment and sometimes requires waiting for equipment to become available. Both are also insecure as others can overhear verbal information and catch sight of forms. Users sometimes become annoyed at the processes as they are often asked for the same exact information from the same recipients, sometimes in a same day. A need exists to conveniently and securely convey information from users to third parties, especially basic information.

In mobile computing devices, manufacturers are outfitting smart phones with NFC devices to securely transfer information from one device to another in very close proximity. A prominent use of the technology, known as electronic wallets or "eWallets," enables smart phones to pay for goods/services instead of cash or swipes of credit cards. During times of payment, phones transfer to near field communication (NFC) terminals the details of a user's credit card, e.g., credit card number, expiration date, three digit card security code, etc. The phone pulls the information from a secure area of memory known as the "secure element." As users often store more than one credit card, the secure element facilitates logical partitions between different cards and their information. Phones equipped with NFC, however, are presently inflexible. By design, users cannot adjust financial information so monetary transactions between phones and terminals occur according to a very rigid and tightly orchestrated protocol. A further need exists, therefore, to facilitate robustness in smart phones to leverage NFC and secure elements. Additional benefits and alternatives are also sought when devising solutions.

SUMMARY

Provisioning applications for use with mobile computing devices solve the above-mentioned and other problems. In representative embodiments, mobile computing devices host operating systems and mobile applications. They include a data transport protocol, such as an NFC subsystem and secure elements. Provisioning applications communicate with the secure elements and the NFC subsystem. The applications cause display of interfaces for users to enter personal attributes for storage in the secure elements. Users later discriminately select items from their personal attributes for NFC transmissions. Third parties receive only those attributes that are relative to their process. Techniques for selecting items include individual selection, by profiles of aggregated attributes, by location, or by recipient, to name a few. Selection occurs in real time or upon user convenience. Third parties contribute to the process by pre-specifying which attributes they would like to receive and/or formatting of the attributes. They can also contemporaneously engage phones for the same purpose. The foregoing obviates the need for users to continually transcribe personal items for third parties. It gives third parties control to dictate only user items of interest. It eliminates extraneous information. It saves on processing manpower and effort. Software, executable code, interfaces, computing system environments, methods, and apparatus typify the embodiments.

Alternate designs note other data transfer protocols such as Bluetooth, wireless USB, etc. Use-cases describe provisioning of user attributes on-demand, by aggregating together multiple attributes according to a type of information typically solicited by businesses, by a geographic or present location of the computing device, and by recipients of the attributes known or selected by the user. For recognition across a wide spectrum of uses, the provisioning application further notes a computing system environment able to recognize a standardized format such as structured XML files transmitted/received according to a predefined schema or a robust environment able to solicit and receive input from third party recipients so as to pre-specify formats of user-information. Still other designs contemplate user options, menus, interfaces, and convenience functions, to name a few. Examples include pages to solicit user attributes according to types of transactions with third parties, automatically configuring attributes having been earlier specified, allowing view/edit functionality at times before sending, and suggestions for types of attributes.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, mobile applications are described for provisioning user attributes. Upon entry and secure storage of the attributes, users discriminately select items for transmission to third party recipients. Only those attributes relative to third parties are sent thus giving control regarding items pertinent to the processes at hand and obviating the need for users to continually transcribe personal items of common interest.

Figure 1:
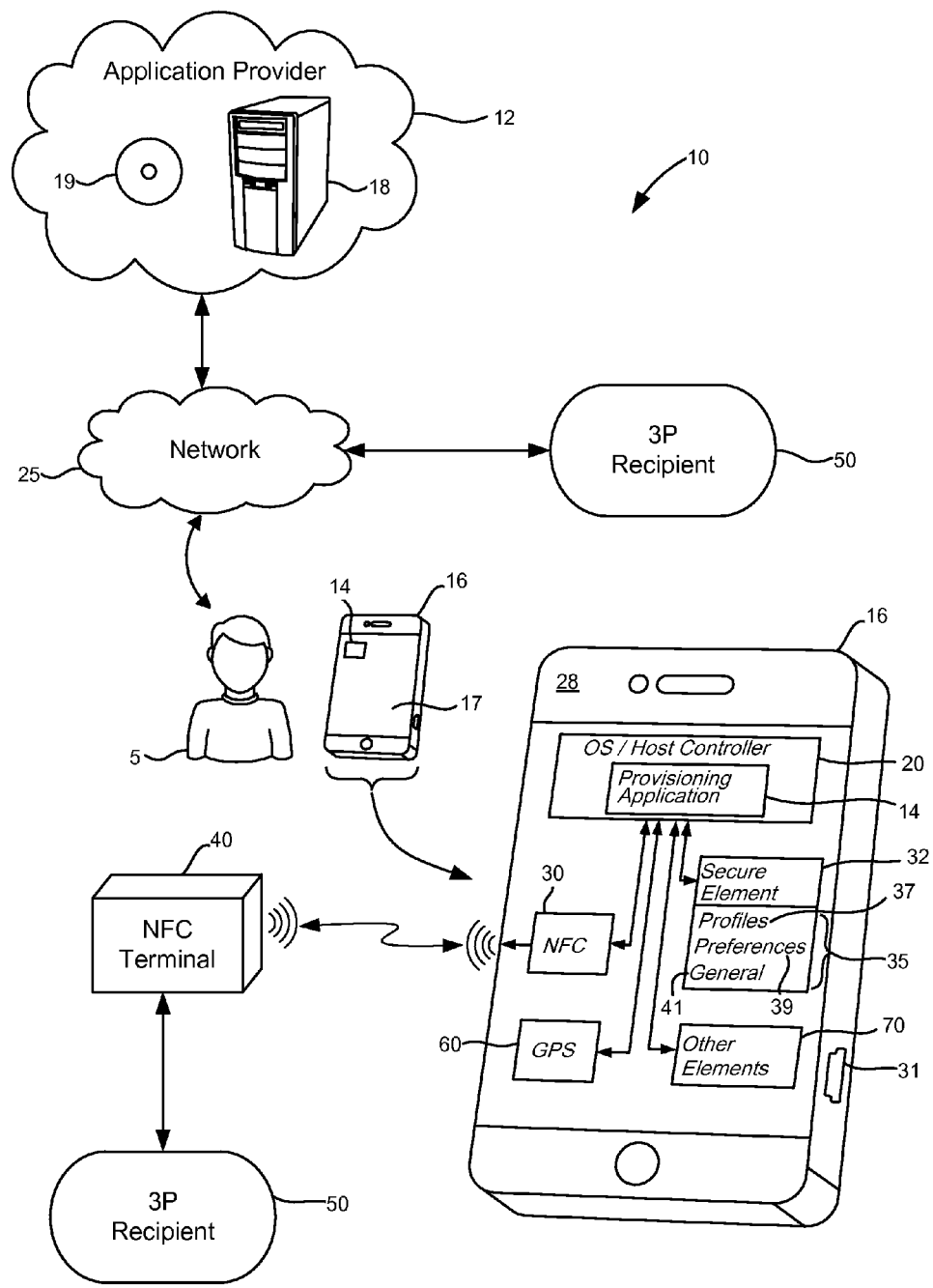
FIG. 1 is a diagrammatic view of a computing system environment for provisioning user attributes for use with a mobile computing device.

With reference to FIG. 1 a computing system environment 10 includes a service provider 12 of mobile applications (colloquially "mobile 'apps'"). The provider makes available a provisioning application 14 that users 5 download onto a mobile computing device 16. The download resides as executable code on a computing device 18 such as a server or imprinted on a computer readable medium 19 such as a CD, smart card, USB stick, etc. Users retrieve the medium and load the provisioning application directly onto their mobile device or with assistance from still another computing device. Alternatively, users execute a series of functions on their mobile device and obtain the requisite code by way of an attendant computing network 25. The network includes or not a variety of software such as an "app store" and hardware such as routers, servers, switches, desktop/laptop computers, phone transmission towers, satellites, etc. The connections typify wired and wireless communications between a few or many devices in an internet, intranet or other environment. Skilled artisans readily understand the process and the requisite actions for downloading applications.

Upon successful receipt of the provisioning application 14, the mobile computing device 16 hosts it on one or more controllers 20 resident in a housing 28. The controller(s) also host an operating system (O.S.) and one or more additional mobile applications, as is typical. A near field communication (NFC) subsystem 30 resides in the housing 28. It is configured physically with the controller(s), on other existing components such as a SIM card, U-Rim card, SD card or other smart card, or independently as a stand-alone component such as an embedded chip. (External cards or other inputs to the smart phone can come from an external slot, such as at 31 on the housing of the phone.) In any configuration, the NFC 30 serves to communicate with a near field communications terminal 40 external to the housing of the mobile computing device. It incorporates proximity communications between two closely situated NFC devices to authenticate and facilitate payment for goods or services. It is readily supported by the Global System for Mobile Communications (GSM) Association and found in a variety of smart phones. Similar to the NFC, the mobile computing device further includes a secure element 32 that resides with the controller(s), other existing components (e.g., aforementioned cards), or as a stand alone component. It functions as a memory device where data objects 35 can be securely stored and retrieved.

During use, the provisioning application 14 communicates with both the secure element 32 and near field communicator 30. The application causes display of an interface on the mobile device whereby users enter personal attributes 37, 39, 41 for storage in the secure element. Users later discriminately select items from their personal attributes and the provisioning application 14 bundles them together for NFC transmission to a third party recipient 50. Third parties receive only those attributes that are pertinent to their business processes.

The provisioning application is also configured to receive input from the third parties recommending which attributes of the personal attributes are relevant for receipt. In one embodiment, the third parties 50 provide input to the application provider 12 by way of the network 25. The third parties notify the application provider 12 as to both the type of information sought from users and the format for sending/receiving. The provider then structures the provisioning application resident on the computing device 18/20 to seek the user attributes in an appropriate fashion and to transmit them in manner recognized by the third parties. It is preferred that the communications environment recognizes a standardized format such as structured XML files transmitted/received according to a predefined schema. Alternatively, the input from third parties 50 arrives in real time at the provisioning application 14 by way of the terminal 40 communicated directly to the mobile device 16. In this way, the application robustly configures together formatting options to solicit user attributes in a manner sought by the third parties. In either, the following figures illustrate use-cases where users provision their attributes according to a variety of needs.

Figure 2:
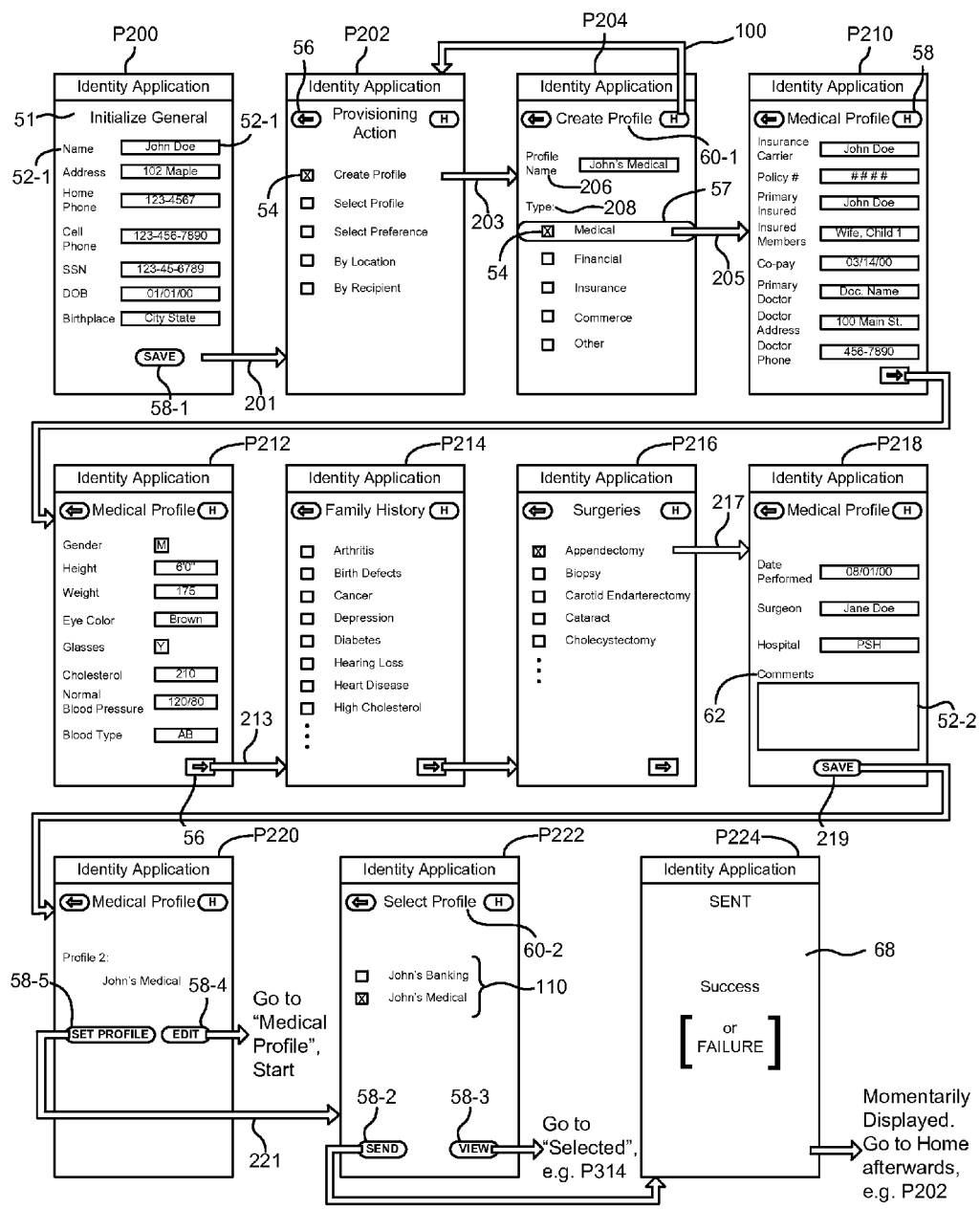
FIG. 2 is a diagrammatic view of an interface for provisioning user attributes, including options for creating and selecting user profiles.

With reference to FIG. 2, users create and select "profiles." Profiles are an aggregation together of multiple user attributes according to a type of information typically solicited by businesses (or by any other manner of grouping). A first use-case notes a "medical" profile for user attributes when visiting a physician's office or gaining admission to a hospital. A later use-case notes a "financial" profile having attributes relevant to basic banking needs. Skilled artisans will readily imagine similar or other profiles depending upon the situation.

The provisioning application first causes display of an interface 51 on a viewing area 17 (FIG. 1) of the mobile computing device 16. The interface is any of a variety whereby users engage the application to navigate pages and enter, save, edit, and retrieve data, etc. Tools envisioned include fields 52 for users to enter letters, symbols, numbers, etc. by way of a keyboard. The keyboard (not shown) is known to skilled artisans. It is often a tactile keyboard on the housing of the mobile device having traditional qwerty or ABC formats or an electronic keyboard in the device's viewing area that users tap or swipe to cause entry of characters.

Other tools include "selection boxes" 54 that users "check" or "x" to indicate selections; navigation arrows 56 to move forward or backward from one viewing screen to a next; or "press-to-select" or "tap" functions, often accompanied by a change of color 57 on the viewing area of the computing device that indicate user selections (sometimes in conjunction with other tools such as selection box 54).

"Buttons" 58 are still further tools that provide a variety of intuitive actions. Upon "depressing" a button, users are navigated 100 direct to a specific page of the viewing screen such as the "home" page upon depressing the home button (H). Any page can serve as the home page for the application and can be equipped with a variety of functions. A home page might be stylized as a page to undertake provisioning actions, a page to display an advertisement, a page to accept/reject a license or other contractual agreement, a page to display a company or other logo, etc. In other buttons, the provisioning application undertakes actions that correspond to the names of the buttons. Buttons of this design have names such as "save" 58-1, "send" 58-2, "view" 58-3, "edit" 58-4, "set profile" 58-5, or the like. Upon users pressing the "save" button, for example, the provisioning application causes the "saving" of data. Similarly, pressing a "view" button allows users to view data, etc.

Titles 60 are also useful tools in the provisioning application to indicate current actions being taken on a particular page. For example, a title "create profile" 60-1 indicates to users that a profile is being created upon selection of items displayed on the viewing area. Similarly, a title "select profile" 60-2 indicates to users that they are to select a profile for communication to a third party. The names of the titles are made as intuitive as possible. "Prompts" 62 are related to titles in that they also indicate actions to users. A "name" prompt 62-1 next to a field 52-1 lets users know to enter their name or lets users know to enter comments in field 52-2 next to the "comments" prompt 62-2. "Status" pages 68 also find utility to let users know a success or failure of an event such as whether user attributes were successfully "sent" 70. Status may also reflect an amount of an activity, such as how much a user has completed a profile under construction. Status indicators may also be fleeting in nature and only momentarily displayed or may exist during an entirety of a process to reflect progress, etc.

By utilizing these and similar tools to engage the provisioning application, the following describes how users create and select profiles for provisioning user attributes. Initially, the application causes display of a page P200 on the viewing area where users enter general information about themselves. Representative attributes include, but are not limited to, name, address, home and cell phone numbers, social security number, date of birth, birthplace location, or the like. As many third parties commonly request information of this type from users, it is gained by the provisioning application in a manner that need not be particularly associated to a named profile or a third party. Hence, the application solicits the data in a preliminary step such as upon the display of an initialization or generalization page. Thereafter, the provisioning application safe keeps the attributes in the secure element (e.g., "save" 58-1) and the attributes are now made available for immediate selection for communication to a third party or to be aggregated together into a "profile."

At action 201, the provisioning application provides users with a menu of options for taking provisioning actions, page P202. Among representative actions, users can create or select profiles, select individual preferences, provision attributes by a particular location, or provision attributes by a known third party recipient of the information. As a user profile need first be "created" before it can be "selected," the provisioning application can display an appropriate page notifying users of this procedural order if users first accidentally "select profile" before having "created" a profile. Alternatively, the option of selecting a profile may be held in abeyance by the provisioning application until such time as the user first creates a profile. On the other hand, users are able to immediately undertake the other provisioning actions of "select preferences," select "by location" or "by recipient" as will be seen in the other figures.

Upon selecting "create profile," the provisioning application provides 203 users with a page P204 that gathers preliminary information about the profile to-be-created. A profile name 206 is designated as is a profile type 208. The name is governed by the user's choice, while the type is governed by pre-packaged selections that the application provides to users. In this instance, the type relates to "medical" attributes about the user and corresponds to the name "John's Medical." Other types of profiles include financial profiles, insurance profiles, commerce profiles, etc. or self-named profiles under the selection "other." Upon designating the name and type of profile, the provisioning application transits 205 the user through a variety of pages in order to aggregate together multiple attributes. The attributes retrieved by the application can be information of a type that is typically solicited by medical businesses or can be prescribed in advance by third parties, such as doctors' offices who will eventually receive such data. The third parties can contribute directly to the application by way of the network 25 (FIG. 1) or in real time by way of its NFC terminal 40 (FIG. 1) by making contemporaneous requests for attributes according to a convention of the provisioning application. In any situation, representative pages of the provisioning application are continued in the example of a "medical" profile.

At page P210, attributes of a user's insurance company and primary physician is gathered. This includes policy names and numbers, names of insured persons, co-pay amounts, primary physician's name/address/phone, etc. At page P212, attributes of a user's physical being are solicited and collected. Representative items of interest here include gender, height, weight, eye color, glasses, cholesterol levels, blood pressure and blood type, etc. Upon entry 213, family history attributes for a user are gathered at page P214 as are surgical information attributes at page P216. Upon the positive indication by the user of a particular item on a page, the provisioning application proceeds 217 to display further pages, e.g., page P218, requesting attributes of further interest. For example, a user having had an appendectomy surgery at page P216 will be further asked to indicate at page P218 when such occurred, who performed the surgery and where, and provide any additional comments. Eventually the provisioning application will finish displaying its pages to the user. At that time users will indicate their desire to "save" 219 or finish their selections of their profile for later retrieval. At page P220 users are asked to confirm their selections by either setting their entries as a profile 58-5 or whether they want to edit their selections 58-4.

If the latter, users are taken back through relevant pages of the profile-under-construction. If the former, the provisioning application bundles together all the relevant attributes having been selected by the users on the various pages and saves them as a single profile in the secure element 32 (FIG. 1) for safekeeping and later transmission. The application also displays 221 a page P222 whereby users can select any of their profiles 110 for immediate communication to third party recipients. Alternatively, users can be displayed the home page P202 to ascertain what provisioning actions they may seek to undertake and from here they can select the option "select profile." In either instance, once "select profile" is the action taken by users, saved profiles 110 from the secure element are presented to the user for their selection. Upon selecting the profile "John's Medical," the provisioning application "sends" it 58-2 to third parties such as a physician's office where the physician's office securely receives attributes pertinent to the physician's office (e.g. at terminal 40, FIG. 1). The process saves the user from ever needing to again fill out forms of this type as all user attributes relevant to recipients of this type are now safely stored in the secure element. A status page P224 then indicates to users that their "sending" of their profile was a success or failure. If successful, users are notified and returned to the home page P202. If not, a "failure" message is displayed where users can be prompted to "try again," "cancel" or take some further corrective action. Users can also "view" 58-3 their selected profile before sending. Viewing selected attributes will be described according to page P314, FIG. 3.

Figure 3:
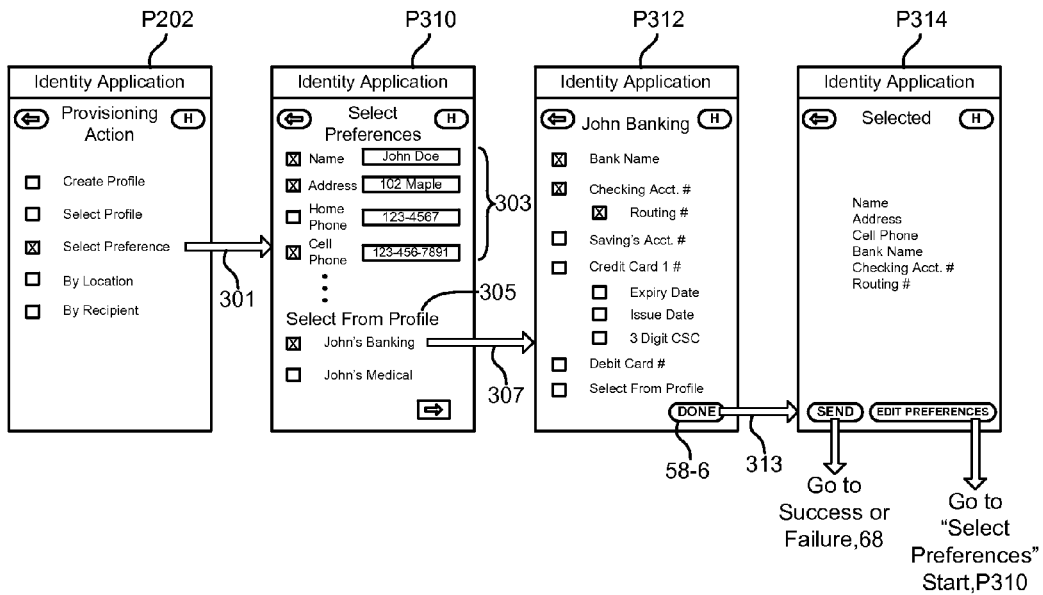
FIG. 3 is a diagrammatic view of an interface for provisioning user attributes, including options for selecting user preferences.

With reference to FIG. 3, another use-case scenario for taking provisioning action from page P202 relates to users "selecting preferences." The provisioning application displays 301 to users a menu or options on page P310 for "on-demand" selecting individual attributes for communication to a third party. In this example, users select ones of their attributes 303 having been earlier stored as part of the initial gathering of general attributes and/or selecting attributes by way of any saved profiles 305. From the general attributes the user selects their name: John Doe; address: 102 Maple; and their cell phone number: 111-1111. They also seek to select attributes from a saved profile named "John's Banking." The provisioning application displays 307 the attributes of the user's financial profile at page P312. Here the user decides to select his Bank Name, Checking Account and Routing Number. As many and diverse attributes have been individually noted by the user, selection of "done" at button 58-6 causes the display 313 of a "Selected" page P314 noting a list of all attributes that the provisioning application has aggregated together for sending to a third party. As seen, the user's name, address, cell phone number, bank name, checking account number and routing number are compiled. Users can now "Send" or "Edit" their attributes.

Figure 4:
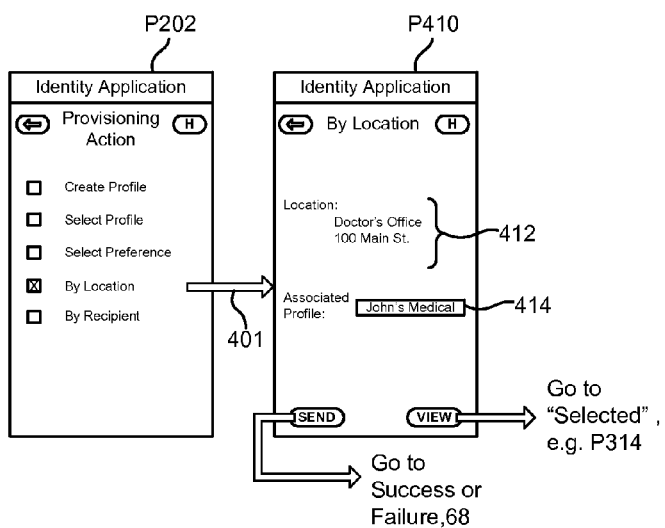
FIG. 4 is a diagrammatic view of an interface for provisioning user attributes, including selecting preferences by location.

With reference to FIG. 1, the provisioning application 14 is further configured to communicate with a positioning system of the mobile device 16. As a GPS (global positioning satellite) or other coordinate system 60 is often integrated within smart phones to precise a whereabouts of the housing of the phone at all times, the provisioning application 14 will use this feature to facilitate a user convenience option for users. With reference to FIG. 4, the functionality of the positioning system is invoked 401 by the provisioning application so users can select items from their personal attributes according to a present location of the housing of the smart phone. To do this, the provisioning application first ascertains the geographic location of the phone from input of the positioning system. It next determines whether any profiles have been earlier sent by the user at this same location (within a margin of distance, say 500 feet, 1 mile, etc.). If so, the provisioning application displays this to the user on a page P410. This includes the location of the mobile device at 412, including or not a picture of a map, phone number, name of any business at this location, etc., and any Profiles associated with this location at 414. Users can then "Send" their attributes to the third party noted at 412 or they can "View" their attributes before sending. On the other hand, if the provisioning application can make no associations of profiles and the location of the mobile device, the application can further consider whether an association might make sense between existing profiles and businesses nearby the present location. To the extent the location of the mobile device is noted nearby an address of a banking institution, the provisioning application might suggest an associated profile of the type noted as a financial profile, such as "John's Banking." Of course other schema and associations could be used for functionality of this type.

For example, it is contemplated that the provisioning application will have access to other elements 70 (FIG. 1) of the mobile computing device. These elements include, but are not limited to, a user's address book, list of contacts, calendar, clock, mapping function, etc. A further use-case includes the provisioning application noting that the present location of the smart phone matches an address stored in the user's address book that corresponds to the user's dentist and that a current time matches (or fits within a margin of error, say 30 minutes, 1 day, etc.) an appointment time stored in the user's calendar. The provisioning application can then suggest to the user or automatically select a medical or dental profile for transmission to the dentist.

Figure 5:
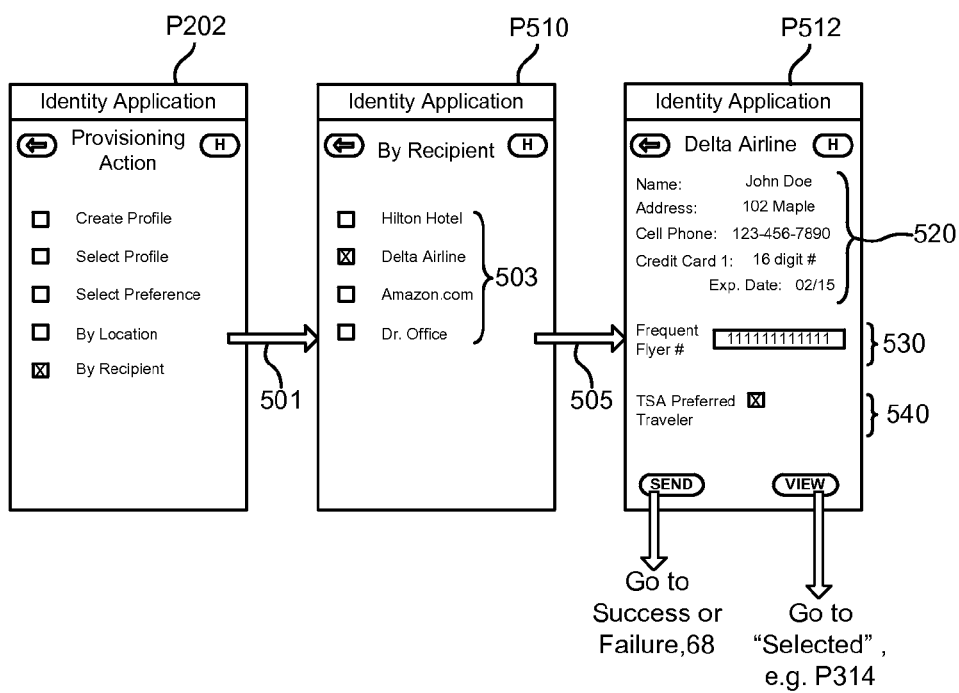
FIG. 5 is a diagrammatic view of an interface for provisioning user attributes, including selecting preferences by recipients of the attributes.

With reference to FIG. 5, users can provision their attributes according to known recipients. By selecting "by recipient" on page P202, the provisioning application proceeds 501 to populate a list 503 of possible recipients. The recipients are gathered variously. They are gathered by noting well known businesses such as those found by ranking services, e.g., Forbes, Standard & Poor's, etc., by correlation to nearby addresses located by the smart phone, by association in which the user has earlier conducted transactions, etc. Once populated, users are free to select a recipient for transmitting their user attributes. The user selects Delta Airlines in the example and the provisioning application displays 505 a page P512.

According to input contemporaneously provided or earlier pre-specified by the recipient (Delta Airlines), the provisioning application is aware of user attributes that the recipient (Delta Airlines) seeks to receive. If at an airport for check-in for a flight, Delta Airlines may want to know 1) a user's name, address and cell phone to contact the user, 2) a credit card number and expiration date for baggage fees, 3) a frequent flyer number to associate with points, and 4) whether or not the user is a preferred traveler according to the Transportation Security Administration (TSA). To the extent the attributes are already known to the provisioning application, further functionality of the application includes automatically populating fields from the secure element for as many attributes as possible 520 to speed the process for both the user and recipient. Users then merely finish completing relevant fields of the page according to the attributes not already known, e.g., frequent flyer number 530 and TSA preferred traveler barcode 540. When finished, users "Send" their attributes to the noted third party or "View" their attributes before sending. Users at this time may also want to save their new attributes in a profile for later usage in a similar situation such as upon a next instance of checking-in at an airport for a flight.

Relative advantages of the many embodiments should now be apparent to skilled artisans. They include but are not limited to: (1) users being able to discriminately select items from their personal attributes for transmission to a third party recipient so that only attributes relative to the third party are sent; (2) obviating the need for users to continually transcribe personal items that are commonly requested by third parties; (3) updating profiles or attributes at a user's convenience so that upon needing to provide information to a third party, attributes are current and users need not waste time readying information for recipients; and (4) supporting the provisioning application by recipients to contemporaneously or pre-specify user attributes of interest to speed processing in providing goods or services and minimizing manpower to receive data.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A mobile computing device, comprising:
   a housing;
   one or more controllers in the housing to host an operating system and one or more mobile applications;

a data transport protocol subsystem in the housing to communicate with a communications terminal external to the housing of the mobile computing device; and a secure element, wherein said one or more mobile applications includes a provisioning application configured to receive personal attributes of a user for storage in the secure element and enable the user to select items from said personal attributes so that the provisioning application bundles together only said select items of the personal attributes for communication by the data transport protocol subsystem to the communications terminal so third party recipients of the select items of personal attributes receive information pertinent to the third party recipients.

2. The mobile computing device of claim 1, wherein the provisioning application is further configured to communicate with a positioning system so users can select items from said personal attributes according to a present location of the housing.

3. The mobile computing device of claim 1, wherein the provisioning application is further configured to receive input from the third party recipients recommending which attributes of the personal attributes are relevant to the third party recipients.

4. The mobile computing device of claim 3, wherein the provisioning application is further configured to automatically populate from the secure element as many attributes as possible according to the recommendations by the third party recipients.

5. The mobile computing device of claim 1, wherein the provisioning application is further configured to allow the users to create one or more profiles of aggregated personal attributes that can be communicated to the third party recipients.

6. The mobile computing device of claim 5, wherein the interface is configured to present options to the users to collect the personal attributes according to a profile type.

7. The mobile computing device of claim 1, wherein the interface is configured to present options to the users so the users can said discriminately select items according to individually selectable preferences, profiles of grouped said personal attributes, profiles associated with a geographic location, or a known said third party recipient.

8. The mobile computing device of claim 1, wherein the interface is configured to present to the user a list of said personal attributes having been selected by the user for sending to the third party recipients.

9. The mobile computing device of claim 1, wherein the provisioning application is configured to collect the personal attributes from the users in a format pre-specified by the third party recipients.

10. The mobile computing device of claim 1, wherein the data transport protocol subsystem includes a near field communication transmitter and receiver.

11. The mobile computing device of claim 1, wherein the data transport protocol subsystem includes Bluetooth or wireless USB.

12. The mobile computing device of claim 1, wherein the provisioning application is further configured to communicate with an address book, list of contacts, calendar, clock, or mapping function in the housing.

13. The mobile computing device of claim 12, wherein the provisioning application is further configured to make suggestions to the users or automatically select a profile of multiple said personal attributes based upon said communication with the address book, list of contacts, calendar, clock, or mapping function.

14. A mobile computing device, comprising:

one or more controllers to host one or more mobile applications;

a data transport protocol subsystem to communicate with an external communications terminal; and a secure element, wherein said one or more mobile applications includes a provisioning application configured to receive input by way of the external communications terminal from a third party recipient recommending which of a plurality of personal attributes of a user are pertinent to the third party recipient and to bundle together from the secure element only the personal attributes of the user said recommended by the third party for communication by the data transport protocol subsystem.

15. The mobile computing device of claim 14, wherein the provisioning application is further configured to cause display of an interface to receive the personal attributes of the user for storage in the secure element.

16. The mobile computing device of claim 14, wherein the provisioning application is further configured to automatically populate from the secure element as many attributes as possible according to the recommendations by the third party recipient.

17. The mobile computing device of claim 14, wherein the provisioning application is configured to present to the user a list of all of the plurality of personal attributes and pre-selecting for confirmation by the user for sending to the third party recipient only the personal attributes of the user said recommended by the third party.

18. The mobile computing device of claim 14, wherein the provisioning application is configured to collect the personal attributes from the user in a format pre-specified by the third party recipient.

* * * * *